(12) United States Patent
Kim

(10) Patent No.: US 7,136,567 B2
(45) Date of Patent: Nov. 14, 2006

(54) CLADDING STRUCTURE OF OPTICAL FIBER LASER

(75) Inventor: Chil Min Kim, Daejeon (KR)

(73) Assignee: Paichai University Industry-Academic Cooperation Foundation (KR)

( * ) Notice: Subject to any disclaimer, the term of this patent is extended or adjusted under 35 U.S.C. 154(b) by 0 days.

(21) Appl. No.: 11/170,068

(22) Filed: Jun. 30, 2005

(65) Prior Publication Data

US 2006/0002435 A1    Jan. 5, 2006

(30) Foreign Application Priority Data

Jun. 30, 2004    (KR) ..................... 10-2004-0050902

(51) Int. Cl.
G02B 6/10    (2006.01)
G02B 6/00    (2006.01)
G02B 6/02    (2006.01)
H01S 3/30    (2006.01)

(52) U.S. Cl. ...................... 385/146; 385/122; 385/123; 372/6

(58) Field of Classification Search .................. 385/14, 385/122, 123, 126–128, 146; 372/6
See application file for complete search history.

(56) References Cited

U.S. PATENT DOCUMENTS

| | | | |
|---|---|---|---|
| 4,815,079 A | | 3/1989 | Snitzer et al. |
| 4,950,318 A | * | 8/1990 | Dyott ........................... 65/403 |
| 5,530,710 A | | 6/1996 | Grubb |
| 5,533,163 A | | 7/1996 | Muendel |
| 5,873,923 A | | 2/1999 | DiGiovanni |
| 5,966,491 A | | 10/1999 | DiGiovanni |
| 6,031,849 A | | 2/2000 | Ball et al. |
| 6,157,763 A | | 12/2000 | Grubb et al. |
| 6,477,307 B1 | * | 11/2002 | Tankala et al. .............. 385/127 |
| 6,483,973 B1 | * | 11/2002 | Mazzarese et al. ......... 385/123 |
| 2002/0181512 A1 | | 12/2002 | Wang et al. |

FOREIGN PATENT DOCUMENTS

EP    0 776 074 A2    5/1997

* cited by examiner

*Primary Examiner*—Brian Healy
*Assistant Examiner*—Charlie Peng
(74) *Attorney, Agent, or Firm*—Fish & Richardson P.C.

(57) ABSTRACT

The present invention relates to a cladding structure of an optical fiber laser capable of allowing efficient optical pumping at a core of the optical fiber laser using the concept of quantum chaos, and more particularly, to a cladding structure of an optical fiber laser, which enables efficient pumping in an optical fiber by constructing the cladding in a non-integrable structure for causing quantum chaos so that a pumping beam injected in the cladding can pass through a core of the optical fiber as much as possible. To this end, the present invention provides a cladding structure of an optical fiber laser having a core formed of a laser medium and a cladding surrounding the core, wherein the cladding has a sectional structure for causing non-integrable quantum chaos so that a pumping beam injected in the cladding is reflected on the boundary of the cladding and then pumps the core of the optical fiber laser, and the structure for causing the non-integrable quantum chaos is a structure having an unstable path on which upon injection of a beam, a slight change of initial direction of the beam results in a completely different subsequent advancing direction of the beam.

12 Claims, 4 Drawing Sheets

(a)

(b)

(a)　　　　　　　　　　　　(b)

(a)　　　　　　　　　　　　(b)

(c)　　　　　　　　　　　　(d)

(a)   (b)

(a)   (b)

(a)

(b)

(c)

CLADDING STRUCTURE OF OPTICAL FIBER LASER

BACKGROUND OF THE INVENTION

1. Field of the Invention

The present invention relates to a cladding structure of an optical fiber laser capable of allowing efficient optical pumping at a core of the optical fiber laser using the concept of quantum chaos, and more particularly, to a cladding structure of an optical fiber laser, which enables efficient pumping in an optical fiber by constructing the cladding in a non-integrable structure for causing quantum chaos so that pumping beams injected in the cladding can pass through a core of the optical fiber as much as possible.

2. Description of the Related Art

In recent years, optical fiber lasers enabling stabilized laser output of several kilowatts have been applied to a variety of industrial fields. Several principal techniques have been recently developed to obtain a laser beam of several kilowatts from an optical fiber laser. One of the techniques is a cladding design technique. Generally, a core of an optical fiber has a small diameter less than 20 µm and undergoes various problems when a laser beam is injected in the core due to the strong intensity of the laser beam. Accordingly, if a diode laser beam as an external pumping light source is injected in a cladding of an optical fiber, the diode laser beam passes through a core of the optical fiber and the laser beam is generated due to pumping at the core with erbium (Er) applied to the interior thereof. At this time, if the pumping light source passes through the core as much as possible, the pumping becomes efficient. Therefore, it is important to design the cladding through which the pumping beam passes.

As for claddings researched heretofore, a cladding is formed in a rectangular shape around an inner cylindrical core as disclosed in U.S. patent application Ser. No. 20020181512, or is formed by cutting both sides of a cylinder as disclosed in U.S. Pat. No. 6,157,763. Theses claddings are shown in FIG. 1. FIG. 1(a) shows a rectangular cladding structure, and FIG. 1(b) shows a cladding structure obtained by cutting both sides of a cylinder.

FIG. 2 shows four paths when a beam reflected on an outer boundary surface of a cladding is incident back to a core in a case where the cladding has a rectangular shape around an inner cylindrical core as in U.S. patent application Ser. No. 20020181512. It can be seen for the four paths that time required from the time when the beam is reflected on the outer boundary to the time when it reaches the core is about 0.92 seconds in FIG. 2(a), infinity in FIG. 2(b), about 12.03 seconds in FIG. 2(c), and about 217.77 seconds in FIG. 2(d). Thus, they show that in the rectangular cladding structure, it takes a great deal of time for the beam reflected on the outer boundary to reach the core or the beam cannot reach the core at all.

FIG. 3 shows a probability in connection with an optical path length that a beam will advance to a core of an optical fiber in 160 thousand arbitrary directions in the rectangular cladding around the inner cylindrical core as in U.S. patent application Ser. No. 20020181512. FIG. 3(a) shows an optical path length with respect to a probability, and FIG. 3(b) shows a logarithmic probability in which a normalized length is reduced exponentially but a probability that a beam will reach the core is lower as compared to a spiral structure. It also shows that there is a beam direction which cannot reach the core eternally due to the finite length of the optical fiber laser.

It also shows that there is a very short pumping direction as well as a long pumping direction in the rectangular cladding structure and this structure is less efficient for optical pumping.

SUMMARY OF THE INVENTION

The present invention is conceived to solve the aforementioned problems. An object of the present invention is to provide a cladding structure of an optical fiber laser, which enables efficient pumping in an optical fiber by constructing the cladding in a non-integrable structure for causing quantum chaos so that pumping beams injected in the cladding can pass through a core of the optical fiber as much as possible.

According to the present invention for achieving the object, there is provided a cladding structure of an optical fiber laser having a core formed of a laser medium and a cladding surrounding the core, wherein the cladding has a sectional structure for causing non-integrable quantum chaos so that a pumping beam injected in the cladding is reflected on the outer boundary of the cladding and then pumps the core of the optical fiber laser, and the structure for causing the non-integrable quantum chaos is a structure having an unstable path on which upon injection of a beam, a slight change of initial directions of the beam results in a completely different subsequent advancing direction of the beam.

An optical fiber has a central portion formed of a medium with a high refraction index, and a surrounding portion formed of a medium with a relatively low refraction index. That is, in view of the cross section of the optical fiber, the central core portion and the cladding portion surrounding the core portion form a dual concentric cylinder. The principle of application of an optical fiber is the principle of total reflection. That is, the optical fiber uses a phenomenon called total reflection occurring when the incident angle of a beam on the interface of two transparent bodies with different refractive indexes satisfies a specific condition.

Recently, there have been many studies on quantum chaos, and attempts to actually implement the quantum chaos have been actively made. One of them is to find the principle of oscillation of a microdisk laser and to design a microdisk laser using the oscillation principle. The quantum chaos refers to a phenomenon in which a slight change in an initial advancing direction of a beam results in a completely different subsequent advancing direction of the beam. This causes an internal unstable path. When this phenomenon is applied to the design of a cladding, the path of a pumping beam passing through the cladding may exhibit chaos, which makes it possible to design the external shape of a cladding through which the pumping beam efficiently passes.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE PREFERRED EMBODIMENTS

Hereinafter, preferred embodiments of the present invention will be described with reference to the accompanying drawings.

Figure 4:
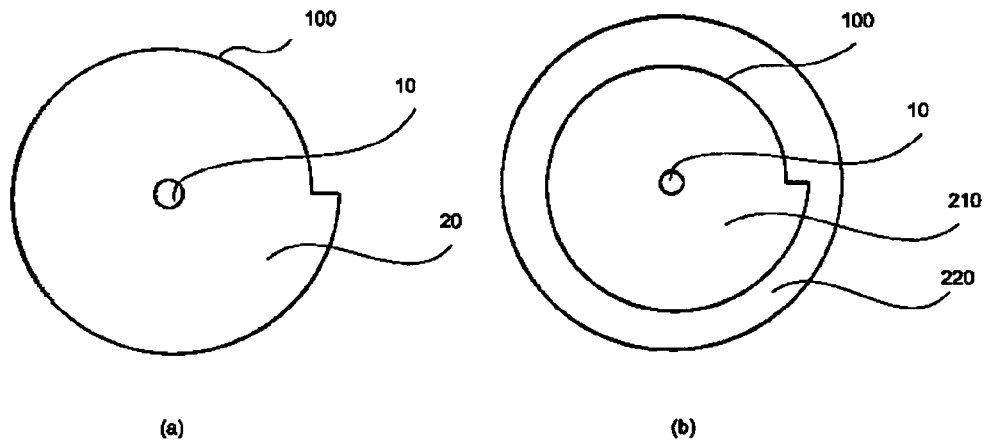
FIG. 4 is a sectional view of a cladding for causing non-integrable quantum chaos according to the present invention.

FIG. 4 is a sectional view of a cladding for causing non-integrable quantum chaos according to the present invention.

In FIG. 4(a), an optical fiber laser comprises a core 10 and a cladding 20. The cladding has a spiral structure. This spiral structure has a configuration obtained by spirally rotating about the core. The radius of the outer boundary increases as the angle increases such that $$r = r_0\left(1 + \frac{\varepsilon}{2\pi}\theta\right),$$

where $r_0$ is the shortest radius at $\theta=0$, $\theta$ is the angle from x-axis, and $\varepsilon$ is the rate of increment of radius depending on the angle. In the structure of FIG. 4(a), a beam that is injected in the cladding undergoes total reflection toward the interior of the optical fiber due to the properties of the optical fiber. At this time, there is a high probability that the beam undergoing the total reflection will advance toward the core of the optical fiber laser due to the structural property for the quantum chaos shown in the figure. Thus, efficient pumping is achieved.

Although the cladding has the spiral structure in FIG. 4(a), it is not necessarily for the cladding to have the spiral structure. It is sufficient that the cladding has a structure for non-integrable quantum chaos. The quantum chaos occurs in a variety of structures. For example, the quantum chaos has been actively studied in a Buminovitch stadium-shaped structure, a heart-shaped structure and the like. In addition, it has been known that the quantum chaos occurs in a number of non-integrable structures. In such structures, when a beam reaches an outer boundary 100, it is reflected inward due to total reflection. In the structures where the quantum chaos occurs, the path of the beam is highly random so that beams advancing in arbitrary directions also undergo rapid changes in the advancing directions to be directed toward the central core. Accordingly, the medium of the core of the optical fiber laser is optically pumped in an efficient manner by the pumping beam, thereby increasing the efficiency of the optical fiber laser.

When the non-integrable quantum chaos structure has angled edges, the angled edges can be processed to be curved, resulting in another non-integrable quantum chaos structure.

FIG. 4(b) shows an optical fiber laser with a dual cladding structure including an inner cladding 210 and an outer cladding 220, in which the cross sections of a core and the inner cladding 210 are designed by way of example into a non-integrable spiral structure where quantum chaos occurs, on the basis of the aforementioned principle of quantum chaos.

Figure 5:
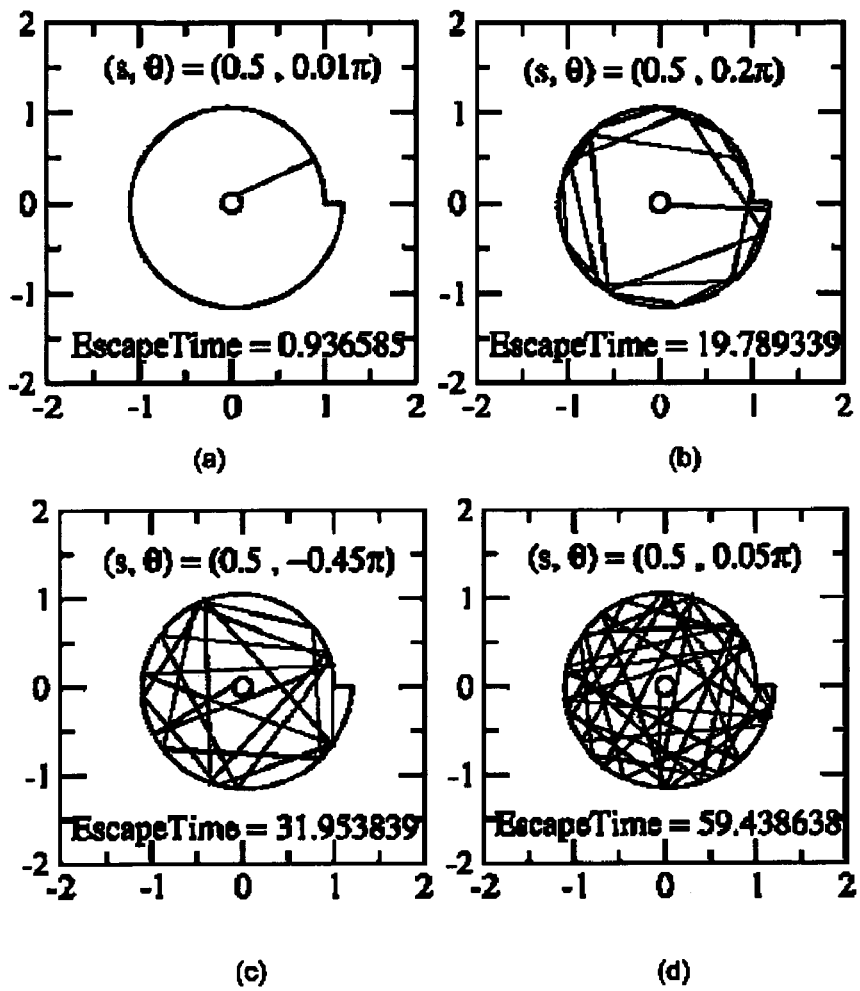
FIG. 5 illustrates results of advancing movement of a beam in the cladding for causing non-integrable quantum chaos according to the present invention.

FIG. 5 illustrates results of advancing movement of a beam in the cladding for causing non-integrable quantum chaos according to the present invention.

That is, it illustrates four cases showing the dynamics of movement of a beam that is reflected on the outer boundary of the inner cladding 210 of the optical fiber and advances toward the core of the optical fiber, using the concept of quantum chaos in a non-integrable spiral structure for causing quantum chaos.

Figure 1:
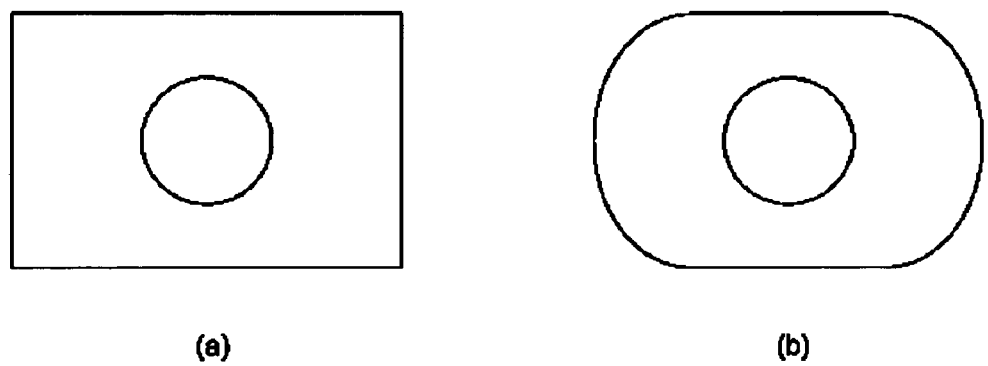
FIG. 1 illustrates a conventional integrable cladding structure of an optical fiber.
Figure 2:
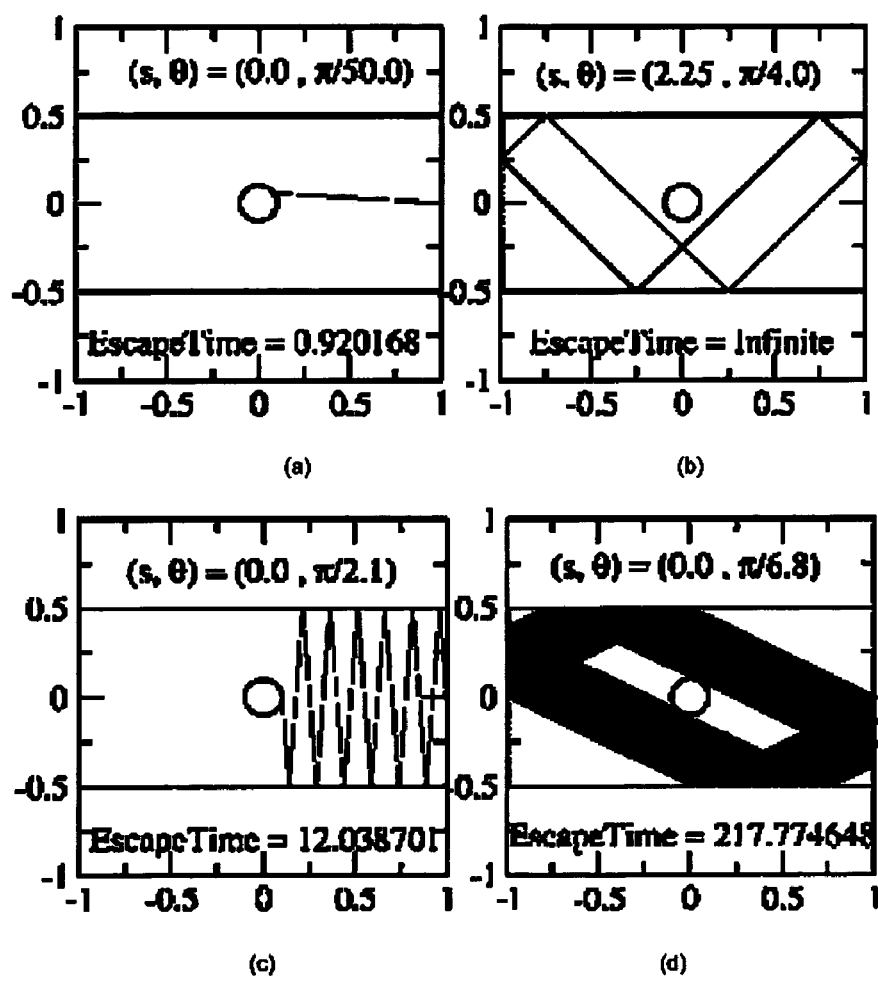
FIG. 2 illustrates results of advancing movement of a beam in a conventional rectangular integrable cladding.
Figure 3:
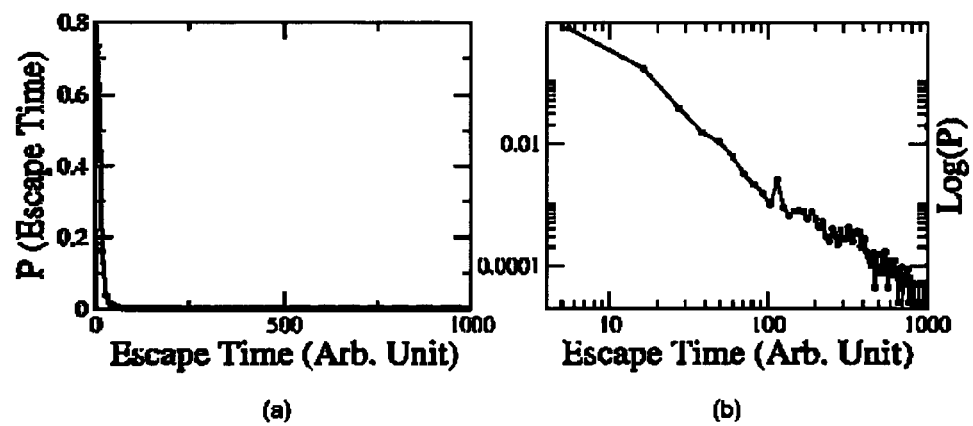
FIG. 3 illustrates a probability in connection with an optical path length that a beam will advance to a core of the optical fiber in 160 thousand arbitrary directions in the conventional rectangular cladding.

As for the four cases, it can be seen that time required from an initial point to the time when the beam reaches the core is about 0.93 seconds in FIG. 5(a), about 19.78 seconds in FIG. 5(b), about 31.95 seconds in FIG. 5(c) and about 59.43 seconds in FIG. 5(d). Here 1 second means the time taking from the boundary to the core. Accordingly, from a comparison of the present invention with the case of FIG. 2, it can be seen that in the rectangular cladding structure, it takes a great deal of time for the beam reflected on the outer boundary to reach the core or the beam cannot reach the core at all, whereas in the non-integrable spiral structure, all beams can reach the core in a shorter time.

Figure 6:
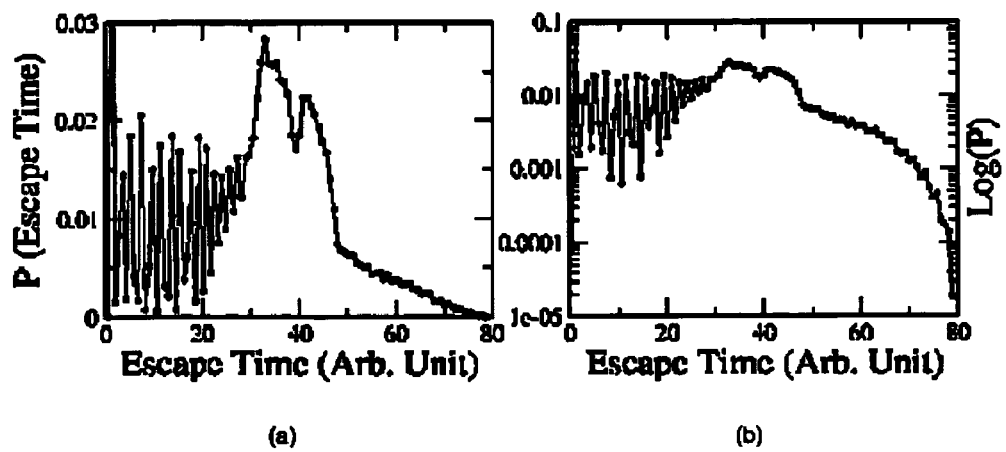
FIG. 6 illustrates a probability in connection with an optical path length that a beam will advance to a core of an optical fiber in 160 thousand arbitrary directions in the cladding for causing non-integrable quantum chaos according to the present invention.

FIG. 6 illustrates a probability in connection with an optical path length that a beam will advance to a core of an optical fiber in 160 thousand arbitrary directions in the cladding for causing non-integrable quantum chaos according to the present invention.

It shows that in the non-integrable spiral cladding structure, an arbitrary beam passes through the core before the number of times that the beam incident on the surface of the cladding is reflected therefrom becomes 80. Further, the spiral cladding structure exhibits uniform distribution in all directions, whereas the rectangular cladding structure shows that there is a very short pumping direction as well as a long pumping direction and thus this structure is less efficient for optical pumping. From a comparison between the two cladding structures, it can be seen that the cladding with the structure for causing the non-integrable quantum chaos optically pumps the optical fiber core in a more efficient manner as compared with the other structure.

Figure 7:
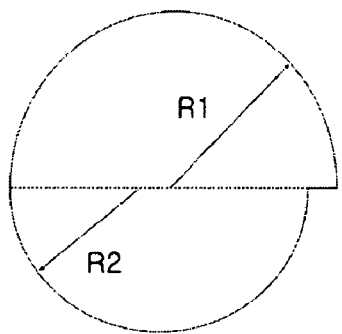
FIG. 7 illustrates modified spiral structures of the cladding.
Figure 7:
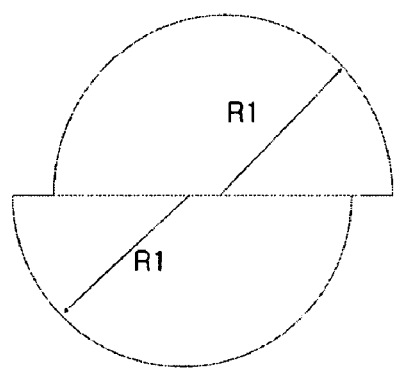
Figure 7:
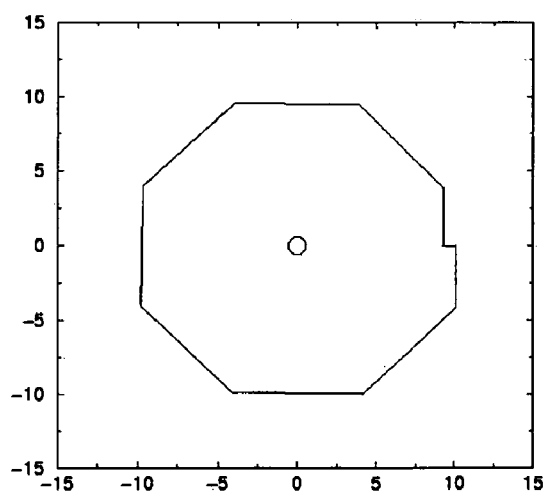

FIG. 7 illustrates modified spiral structures of the cladding. FIG. 7(a) illustrates a configuration of the structure is considered as a configuration obtained by combining two semicircles of different diameters with each other such that only a portion of a circumference defined by the semicircles is mismatched. This structure also gives similar behavior to the spiral structure. FIG. 7(b) illustrates a configuration of the structure is considered as a configuration obtained by combining two semicircles which is mismatched. And FIG. 7(c) illustrates polygon type spiral structure.

In the embodiment of the present inventions, it is possible to effectively increase incidence of pumping beams on the surface of the optical fiber cladding by changing an optical transfer path through flexing or bending of the optical fiber.

As described above, the present invention provides a cladding structure of an optical fiber laser, which enables efficient pumping in an optical fiber by constructing the cladding in a non-integrable structure for causing quantum chaos so that pumping beams injected in the cladding can pass through a core of the optical fiber as much as possible.

Thus, all injected pumping beams optically pump the optical fiber core so that all the beams reach the core in a shorter time.

Although the present invention has been described in connection with the preferred embodiments thereof, it will be understood by those skilled in the art that various modifications and changes can be made thereto without departing from the scope of the present invention defined by the appended claims. Therefore, such modifications and changes fall within the scope of the present invention.

What is claimed is:

1. A cladding structure of an optical fiber laser having a core formed of a laser medium and a cladding surrounding the core, wherein the cladding has a sectional structure for causing non-integrable quantum chaos so that a pumping beam injected in the cladding is reflected on the outer boundary of the cladding and then pumps the core of the optical fiber laser, and the structure for causing the non-integrable quantum chaos is a structure having an unstable path on which upon injection of a beam, a slight difference in initial direction of the beam results in a completely different subsequent advancing direction of the beam.

2. The structure as claimed in claim 1, wherein the structure for causing the non-integrable quantum chaos is one of a spiral structure, a Buminovitch stadium-shaped structure, and a heart-shaped structure.

3. The structure as claimed in claim 2, wherein the spiral structure includes modified configurations of the spiral structure by combining two semicircles of different diameters with each other such that only a portion of a circumference defined by the semicircles is mismatched and by combining two semicircles with the same diameter, such that the flat parts of the two semicircles are mismatched.

4. The structure as claimed in claim 2, wherein the spiral structure includes polygon type spiral structure.

5. The structure as claimed in claim 1, wherein the optical fiber laser has a structure in which an optical transfer path can be changed through flexing or bending thereof to increase incidence of pumping beams on the surface of the optical fiber cladding.

6. The structure as claimed in claim 1, wherein if the structure for causing the non-integrable quantum chaos has angled edges, the angled edges are processed to be curved.

7. A cladding structure of an optical fiber laser with a dual cladding, the optical fiber laser having a core formed of a laser medium, an inner cladding surrounding the core and an outer cladding surrounding the inner cladding, wherein the inner cladding has a sectional structure for causing non-integrable quantum chaos so that a pumping beam injected in the inner cladding is reflected on the boundary of the inner cladding and then pumps the core of the optical fiber laser, and the structure for causing the non-integrable quantum chaos is a structure having an unstable path on which upon injection of a beam, a slight change in initial directions of the beam results in a completely different subsequent advancing direction of the beam.

8. The structure as claimed in claim 7, wherein the structure for causing the non-integrable quantum chaos is one of a spiral structure, a Buminovitch stadium-shaped structure, and a heart-shaped structure.

9. The structure as claimed in claim 8, wherein the spiral structure includes modified configurations of the spiral structure by combining two semicircles of different diameters with each other such that only a portion of a circumference defined by the semicircles is mismatched and by combining two semicircles with the same diameter, such that the flat parts of the two semicircles are mismatched.

10. The structure as claimed in claim 8, wherein the spiral structure includes polygon type spiral structure.

11. The structure as claimed in claim 7, wherein the optical fiber laser has a structure in which an optical transfer path can be changed through flexing or bending thereof to increase incidence of pumping beams on the surface of the optical fiber cladding.

12. The structure as claimed in claim 7, wherein if the structure for causing the non-integrable quantum chaos has angled edges, the angled edges are processed to be curved.

* * * * *